United States Patent
Kala et al.

(10) Patent No.: US 10,713,573 B2
(45) Date of Patent: Jul. 14, 2020

(54) METHODS AND SYSTEMS FOR IDENTIFYING AND PRIORITIZING INSIGHTS FROM HIDDEN PATTERNS

(71) Applicant: Icube Global LLC, Jacksonville, FL (US)

(72) Inventors: Kiran Kala, Jacksonville, FL (US); Jonnavithula Suryaprakash, Hyderabad (IN); Kolluru Venkata Dakshina Murthy, Hyderabad (IN)

(73) Assignee: ICUBE GLOBAL LLC, Jacksonville, FL (US)

( * ) Notice: Subject to any disclaimer, the term of this patent is extended or adjusted under 35 U.S.C. 154(b) by 973 days.

(21) Appl. No.: 15/241,889

(22) Filed: Aug. 19, 2016

(65) Prior Publication Data

US 2017/0053206 A1    Feb. 23, 2017

(51) Int. Cl.
*G06N 5/02* (2006.01)
*G06F 16/26* (2019.01)
*G06N 5/04* (2006.01)
*G06F 16/2458* (2019.01)

(52) U.S. Cl.
CPC .............. *G06N 5/025* (2013.01); *G06F 16/26* (2019.01); *G06N 5/02* (2013.01); *G06F 16/2465* (2019.01); *G06F 2216/03* (2013.01); *G06N 5/04* (2013.01)

(58) Field of Classification Search
CPC .... G06F 16/2465; G06F 16/26; G06F 16/258; G06F 2216/03; G06N 5/02; G06N 5/025; G06N 5/04

USPC .............. 707/776; 706/45, 46, 47
See application file for complete search history.

(56) References Cited

U.S. PATENT DOCUMENTS

| | | | |
|---|---|---|---|
| 2010/0332444 A1* | 12/2010 | Akatsu ................. | G06N 5/003 706/54 |
| 2014/0058763 A1* | 2/2014 | Zizzamia .............. | G06Q 40/08 705/4 |
| 2014/0156639 A1* | 6/2014 | Shridhar ............. | G06F 16/2462 707/722 |
| 2016/0078352 A1* | 3/2016 | Pallath ................. | G06T 11/60 706/11 |

* cited by examiner

*Primary Examiner* — Shane D Woolwine
(74) *Attorney, Agent, or Firm* — Manava & Kang, P.C.; Vinay Malik

(57) ABSTRACT

A method and system for identifying and prioritizing business useful insights from hidden patterns. This invention relates to data mining techniques and more particularly to identify and prioritize insights from a plurality of insights present in a large set of data. Insight exploration is a method and system that enables the user to generate actionable insights, prioritize them for a given data. This falls broadly within the field of data mining. The primary achievement of this invention is to take a rule in if-then format and then systematically process them to identify actionable information from them. In that process, the system automatically prioritizes the rules, generates other rules and analyzes the path that leads to desired behavioral changes.

12 Claims, 9 Drawing Sheets

METHODS AND SYSTEMS FOR IDENTIFYING AND PRIORITIZING INSIGHTS FROM HIDDEN PATTERNS

CROSS REFERENCE TO RELATED APPLICATIONS

This application is based on and derives the benefit of Indian Provisional Application 4355/CHE/2015 filed on 20 Aug. 2015, the contents of which are incorporated herein by reference.

FIELD OF INVENTION

This invention relates to data mining techniques and more particularly to identify and prioritize insights from a plurality of insights present in a large set of data.

BACKGROUND OF INVENTION

Data mining refers to an automated process of identifying systematic and generalized patterns within large volumes of historical data, so that it can be applied on new scenarios. As a first step, the business problem is identified and clearly outlined. Then, based on the class of problem identified and defined, suitable data preprocessing steps are identified and applied. Later, appropriate predictive models are applied and data insights are retrieved. Developing data rules can require significant amount of user time, effort and skill to analyze a pattern in the data especially when the data is very huge. Generally, the entire process of discovering patterns from data is cumbersome and time consuming.

A current solution implements a data processing system for directed data analysis. The system receives rules that represent relationship between several elements of the dataset. The system then displays rules and computes business measures of quality associated with rules. The user may change the rule by adding, deleting or changing the parameters of the rule. In addition to this, a graphical user interface is provided to display the rule and allow users to manipulate and perform directed data analysis.

Another solution discloses using a data mining algorithm to generate rules used to validate the rules on the selected region of a predicted column. Multiple rules are generated to associate conditions in the at least one predictor column with subsequences in selected region. The process qualifies the rules based on minimum support and confidence levels configured and ignore ones that do not qualify. The rule repository stores rules in a common format although being generated from multiple algorithms. The rule discovery user interface allows the user to specify one or more parameters to the engine in order to retrieve rules.

Another solution discloses generation of formatted rules that are used to validate on the dataset. The data comes in with several columns and each one with a different data type. Although several methods are available that identify the format, but fail to find if it is a valid format or not. The solution identifies the format of each data column and marks the formats and presents it in a user readable format and available for further manipulation.

Another solution discloses automatic identification of statistically significant patterns from data and initiation of analysis based on the identification. A decision tree approach of various embodiments may facilitate a reference for further analysis to pattern extraction. The current system employs N time rule to cap the number of statistically significant patterns to be extracted. In the current implementation, N can be 10. But algorithm has no limitation on N, however the system resources and data size will influence the time of extraction. An approach provides an article of manufacture for managing validation of models and rules to apply on the datasets. A schema definition validating the structure of data for compatibility along with the data quality model is determined at every stage of the data model.

As mentioned above, there are several approaches using rule engines that read data and generate rules using data mining algorithms, however these do not interpret and validate the read data and rules. Current systems do not take into account about the attribute types of the data such as if the data is actionable or not, if the data belongs to a particular group as demographics, transaction, and so on.

OBJECT OF INVENTION

The principal object of this invention is to propose methods and systems to extract statistically significant patterns describing a specific behavior from a provided set of data and then enabling modifications of the existing rules and provide recommendations that will enable decision making.

Another object of the invention is to provide methods and systems for finding optimal insights while transforming a subgroup of data from an undesired segment to a desired segment.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
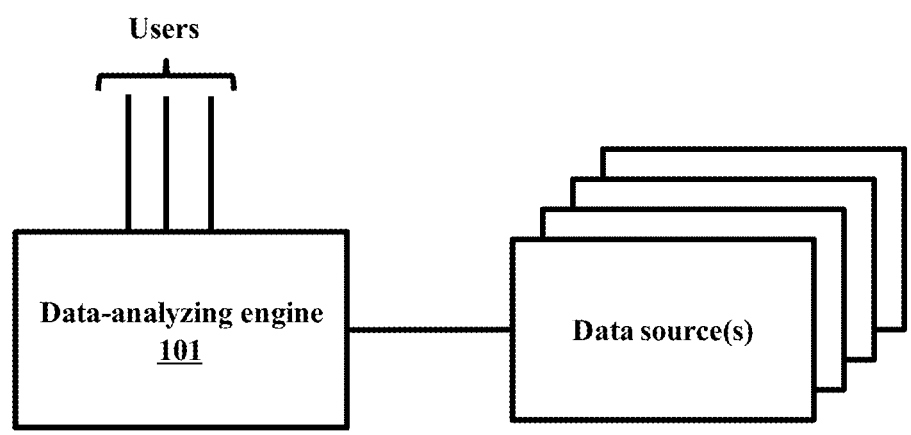
FIG. 1 depicts system for analyzing data, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein propose a method and system to extract statistically significant patterns describing a specific behavior from a provided set of data and then enabling modifications of the existing rules and provide recommendations that will enable decision making. Referring now to the drawings, and more particularly to FIGS. 1 through 9, where similar reference characters denote corresponding features consistently throughout the figures, there are shown preferred embodiments.

Embodiments herein disclose methods and systems of systematically and automatically prioritizing the large number of rules generated and enabling user to do some extremely relevant business operations automatically. Embodiments herein prioritize the rules generated using a metric/score. In an embodiment herein, the metric uses a Monte-Carlo simulation to generate thresholds to define scores such as the support score, confidence score, lift score and as defined below:

Support: Support is the ratio of data points supporting an insight to the total number of data points in a dataset under consideration.

Confidence: Confidence is the ratio of the of data points supporting the insight to the data points supporting only left hand side of the insight.

Lift: The lift is the factor by which the confidence of insight exceeds the expected confidence. It is the ratio of the confidence of the insight to the expected confidence or class confidence.

Class confidence: Typically, data used to extract insights will have one attribute called Target say Customer_Life_Time_ Value (CLTV) in a data that comprises of customer sales transactions data in any industry as an example. However, the method is applicable to any industry. Consider that CLTV can take high, medium and low discrete values describing three levels of customer in terms of their life time value to the company that is providing its products and/or services. Then every insight system generated, has a LHS and RHS side as below. The RHS in this case is CLTV and it takes a value that can be either high or medium or low (one of the possible values of CLTV). Every insight is in the form of If LHS then RHS LHS=Left hand side
RHS=Right hand side Consider the following insight as an example, if Age is GE23 and City is Phoenix then CLTV=high. Here,
LHS is If Age is GE 23 and City is Phoenix
RHS is CLTV=high
What this insight means is that in City Phoenix, customers of Age greater than or equal to 23 years old are exhibiting High CLTV for the business in terms of sales.

In order to explain further the terminology introduced here, assume total data points supplied are 100. Of the 100 customer data points, there are 20, 30, and 50 customers of high, medium and low classes respectively. Then a class confidence for low is 50/100=50%. Similarly, 30% for medium and 20% for high.

Now say out of the 100 data points, there are 15 data points supporting LHS, i.e. they are all greater than or equal to the age of 23 and live in Phoenix. Of the 15, there are 6 of them with a high CLTV.
Support of insight=15/100=15%
Confidence=6/15=60%
Lift of the above insight=60/20=3 time.

Support, Confidence and Lift are referred to as the metrics of the insight

The scores are then studied and the goodness for the rules is derived. The process of the derivation of the goodness of the rules has been disclosed in the following patent applications as shown below as IntuceoRuleScore: U.S. application Ser. No. 14/802,997 and Indian application 3552/CHE/ 2014. The hidden insights can be sorted based on the scores to demonstrate the topmost insights. Embodiments herein also can use unique business metrics like explicability, and so on to provide a dashboard of insights that are ordered based on these metrics.

$$SupportScore(SS) = -(S\log_2 S + (1-S)\log_2 S)$$

$$ConfidenceScore(CS) = C, \left\{ \text{if } \ldots C > \frac{1}{\text{no. classes}} \right\} \text{else} = 0$$

$$LiftScore(LS) = \log_2 L$$

$$LS = \frac{LS - \min(LS)}{\max(LS) - \min(LS)} \text{\#Normalization}$$

$$IntuceoRuleScore = SS^2 + CS^2 + LS^2$$

Data points refer to data on which insights are generated and then explored. In an example, data can be in format of an Excel file, Comma Separated Values (CSV), tables, and so on. Considering in an example that the data is in the form of a table, there is a row number, and each row is called instance or observation or record. Typically, the first row can be a header and gives the name for each column called attributes. There can be two types of attributes; numerical or continuous (such as temperature, profit, ratings, scores, and so on). Another type of attribute can be categorical such as color of the product (red, yellow, green, and so on). So, the Attribute name "Color of the Product" has three levels "Red, Yellow, Green". Some of the levels may be more often present than others. The most frequent level is called the mode of that attribute. For example, if Red is the most common attribute, red can be called the mode of that attribute. Similarly, a continuous variable has min, max, mean or median or variance or standard deviation and so on.

Embodiments herein enable the user to explore what is the smallest path the user can take to automatically alter the behavior of the rule. For example, say a rule says if X=x, Y=y, then the user is a Non-buyer. Embodiments herein automatically identify the easiest path to transform these users (non-buyers) into buyers. For the changed rules, the goodness metrics can be measured and amongst the possibilities, the possibility with the best goodness metric is picked.

Embodiments herein disclose generalizations, wherein condition(s) can be dropped from the rules to create super sets that may show a different behavior in which the current sub set is an outlier. This can be achieved by a greedy search wherein the attribute that reduces the confidence list and increases the support most is the first one dropped. The process can be iterated for any level of generalization.

Embodiments herein disclose specializations, wherein condition(s) can be added to the rule to see whether a sub-set can be identified that behaves differently from the other sub-sets. This can be achieved through a greedy prism search within the subset of the data explained by the rule. The prism can preferentially search for the rules that explain different behavior.

Embodiments herein disclose acting on the rule, wherein the levels of the actionable attributes can be systematically varied to see whether any such change results in a behavioral change. A suitable means such as brute search can be used for this.

Embodiments herein automatically find optimal insights by searching a plurality of possible operations and provide recommended insights for the desired target class level.

Embodiments herein enable the user to save these newly generated insights as part of the basket of insights and further visualize these insights. The above insights can be easily integrated into any of the business intelligence systems for decision making.

FIG. 1 depicts a system for analyzing data, according to embodiments as disclosed herein. The system, as depicted, comprises of a data-analyzing engine 101. The data-analyzing engine 101 is connected to at least one data source. The data source can comprise of at least one database, a server (such as a file server, a database server, a content management server, an application server and so on), a memory and so on. The server can be any server configured to contain information; for example, a file server, a database server, a content management server and so on. The memory can be a dedicated memory device such as a hard disk, a SSD (Solid State Drive) and so on, wherein the data-analyzing engine 101 has access to the memory.

The data-analyzing engine 101 reads the data from the data source(s). On reading the data, the data-analyzing engine 101 eliminates inconsistent attributes, fills the missing values, discretizes numeric attributes, and so on. The data-analyzing engine 101 further generates several hidden insights using a suitable insight generation method.

The data-analyzing engine 101 can prompt a user to feed business hunches in a suitable format such as an 'if-then' format. The data-analyzing engine 101 can validate and flag whether a hunch is supported by the data or not.

The data-analyzing engine 101 can display all the hidden insights in the form of a chart to give a single complete picture of the insights, wherein the chart could be any type of chart which can be used to represent data (such as a scatter plot, a line graph and so on).

Figure 2:
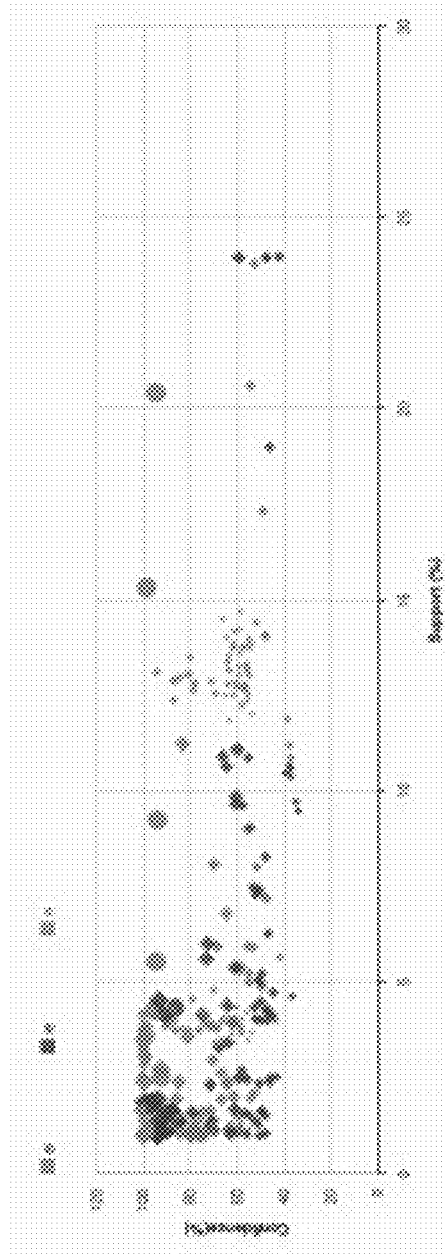
FIG. 2 depicts a scatter plot, where x-axis is support of the insights, y-axis is the confidence of the insights and size of each insight represents the lift of the insight, according to embodiments as disclosed herein.

An example chart is displayed in FIG. 2. A scatter plot is displayed, where x-axis is support of the insights, y-axis is the confidence of the insights and size of each insight represents the lift of the insight. The user could use the plot to pick insight by focusing on a specific region of the chart. For instance, the user may be interested in insights with high confidence only or insights with high support and high confidence, and so on.

The data-analyzing engine 101 can also provide an interface for the user to view the details of the insights along with the statistical metrics and additional metrics that are proposed here. The data-analyzing engine 101 can enable the user to also view the generated insights in a format such as 'if-then' format and so on.

The data-analyzing engine 101 can initially identify topmost quality insights generated from a plurality of hidden insights. The data-analyzing engine 101 can also provide a dashboard of insights by other scores to demonstrate business value to the users.

The data-analyzing engine 101 automatically generates new insights using suitable techniques such as specialization, generalization, what-if scenarios and so on. Embodiments herein find an optimal way of automatically transforming a segment of data to a desired segment.

The data-analyzing engine 101 can display all the attributes, number of levels per categorical attributes, system identified attribute types and so on. The data-analyzing engine 101 can enable the user to edit the attributes, number of levels per categorical attributes, system identified attribute types and so on.

The data-analyzing engine 101 can enable users to define if the attribute is actionable or not. The attribute can be considered as 'Actionable' if the user can change the level of the attribute through at least one business process. So, an attribute like "gender" is not actionable whereas "discount offered" is actionable. The attribute Campaign Mode that has options such as direct, email, phone, pamphlets are considered as actionable because the user can switch between the options and evaluate the impact of a business decision.

Triviality is defined as a quality that is inversely proportional to the number of conditions in the LHS (Left Hand Side) of a rule and its support. So, short rules with large support are trivial. Large rules with small support are hidden and non-trivial. The exact mathematical formula used for triviality is $$\text{Triviality} = \text{support} * \left(1 - e^{-\frac{50}{exp(length)}}\right)$$

Embodiments herein take a rule in if-then format and then systematically process the rule to identify actionable information from them. In that process, the embodiments herein automatically prioritize the rules, generate other rules and analyze the path that leads to desired behavioral changes.

Figure 3:
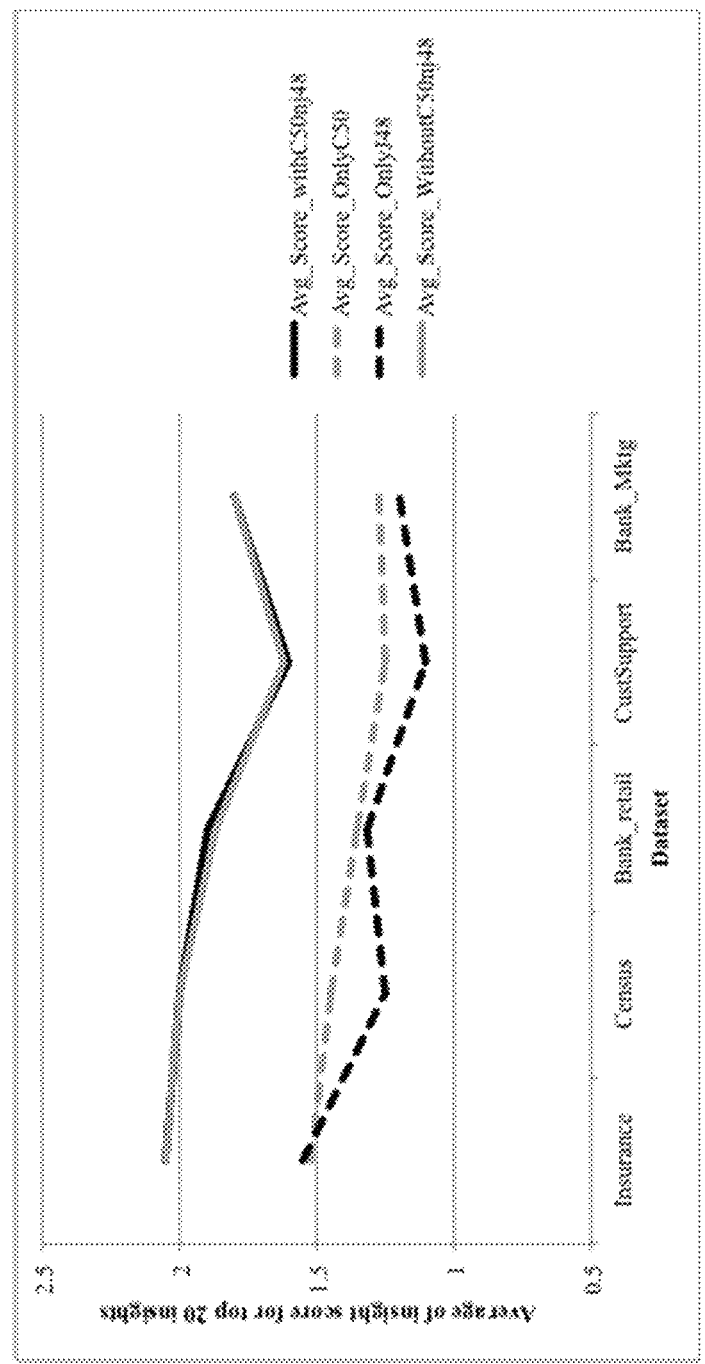
FIG. 3 depicts an example graph of average score comparisons of top 20 insights for 5 different business cases, according to embodiments as disclosed herein.

FIG. 3 depicts an example graph of average score comparisons of top twenty insights for five different business cases.

Figure 4:
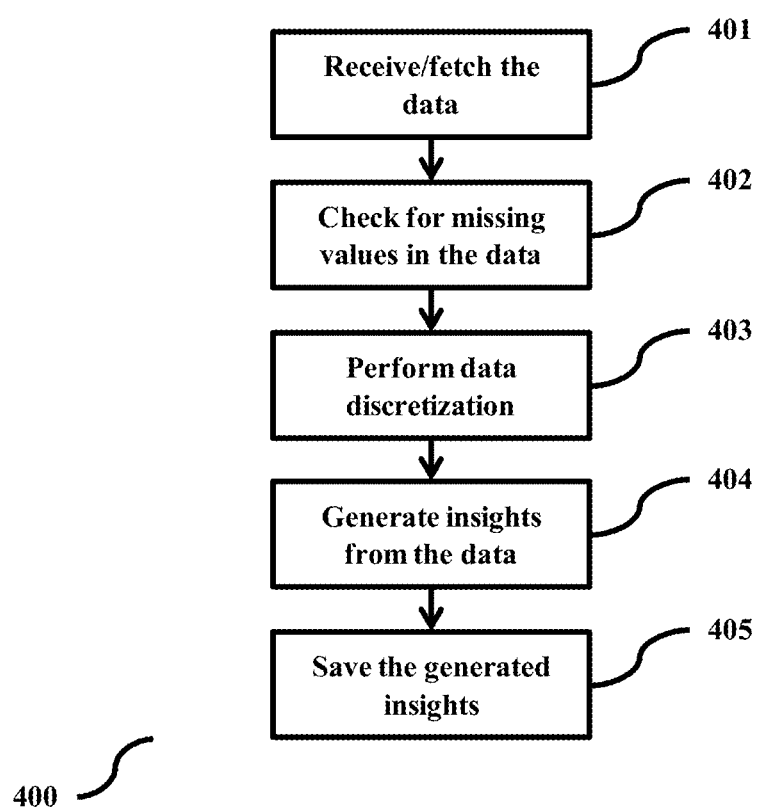
FIG. 4 is a consolidated flow chart for Insight Explorer module, according to embodiments as disclosed herein.

FIG. 4 depicts a flowchart for the process of generating insights and applying the insights. On receiving/fetching (401) the data, the data-analyzing engine 101 checks (402) for missing values in the data. The data-analyzing engine 101 can check for missing values using a suitable means such as looking for gaps in sequential data, or any other suitable means. On detecting missing value(s), the data-analyzing engine 101 can take at least one action such as providing an alert to at least one user, flagging the locations of the missing values, filling the missing values, or any other equivalent action. The data-analyzing engine 101 can further filter out the inconsistent attributes from the data. The data-analyzing engine 101 further performs (403) data discretization on the data. The data-analyzing engine 101 can perform discretization on the data, when the data is in numerical format. The data-analyzing engine 101 then generates (404) insights from the data. Insights can be generated using any suitable method, known a priori. In an example herein, the insights can be generated using the process and/or system as disclosed in the following patent applications: U.S. application Ser. No. 14/802,997 and Indian application 3552/CHE/2014. On generating the insights, the data-analyzing engine 101 saves (405) the generated insights in a suitable location. Before saving the insight, the data-analyzing engine 101 can check if the insight already exists. If the insight already exists, the data-analyzing engine 101 need not save the insight. In an embodiment herein, the data-analyzing engine 101 can validate the business insights, either manually, semi-automatically or automatically. Using the generated insights and using at least one actionable attribute, the data-analyzing engine 101 can perform at least one action such as generalizing the generated insight, specializing the insight, customizing the insight, and so on. The data-analyzing engine 101 can also enable a user to visualize the generated insight, in a format as required by the user such as tables, graphs, charts, or any other equivalent means. The various actions in method 400 may be performed in the order presented, in a different order or simultaneously. Further, in some embodiments, some actions listed in FIG. 4 may be omitted.

Figure 5:
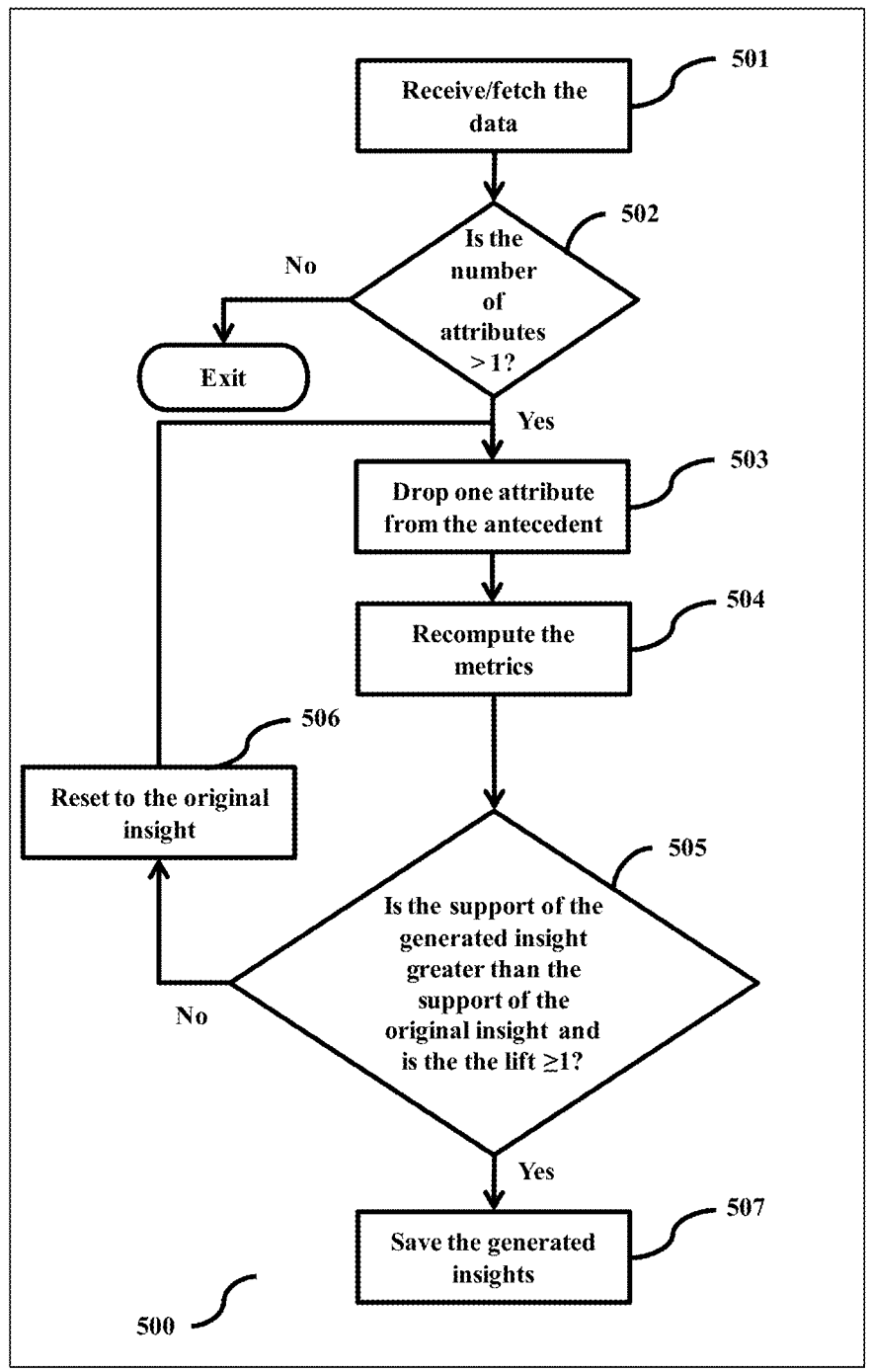
FIG. 5 depicts a flow chart for generating generalized insight from a given rule, according to embodiments as disclosed herein.

FIG. 5 depicts a flow chart for generating generalized insights from a given rule. The data-analyzing engine 101 reads (501) the generated insight and checks (502) if the number of attributes in the antecedent, is greater than 1. Antecedent meaning the attributes on the LHS of the insight. Consider the following insight: "if Jobcode>=20 and City=Phoenix, then customer is no_churn", here Jobcode and City are antecedents. If the number of attributes is greater than 1, then the data-analyzing engine 101 drops (503) one attribute from the antecedent and recomputes (504) the metrics. The data-analyzing engine 101 further checks (505) if the support of the generated insight is greater than the support of the original insight and Lift of the generated insight is greater than or equal to 1. If the support of the generated insight is not greater than the support of the original insight and/or Lift of the generated insight is less than 1, the data-analyzing engine 101 resets (506) to the original insight. If the support of the generated insight is greater than the support of the original insight and lift of the generated insight is greater than or equal to 1, the data-analyzing engine 101 saves (507) the generated insight, if the generated insight has not been saved previously. On the data-analyzing engine 101 trying all attributes of the insight, the data-analyzing engine 101 can terminate the process as depicted in FIG. 5. The various actions in method 500 may be performed in the order presented, in a different order or simultaneously. Further, in some embodiments, some actions listed in FIG. 5 may be omitted.

Figure 6:
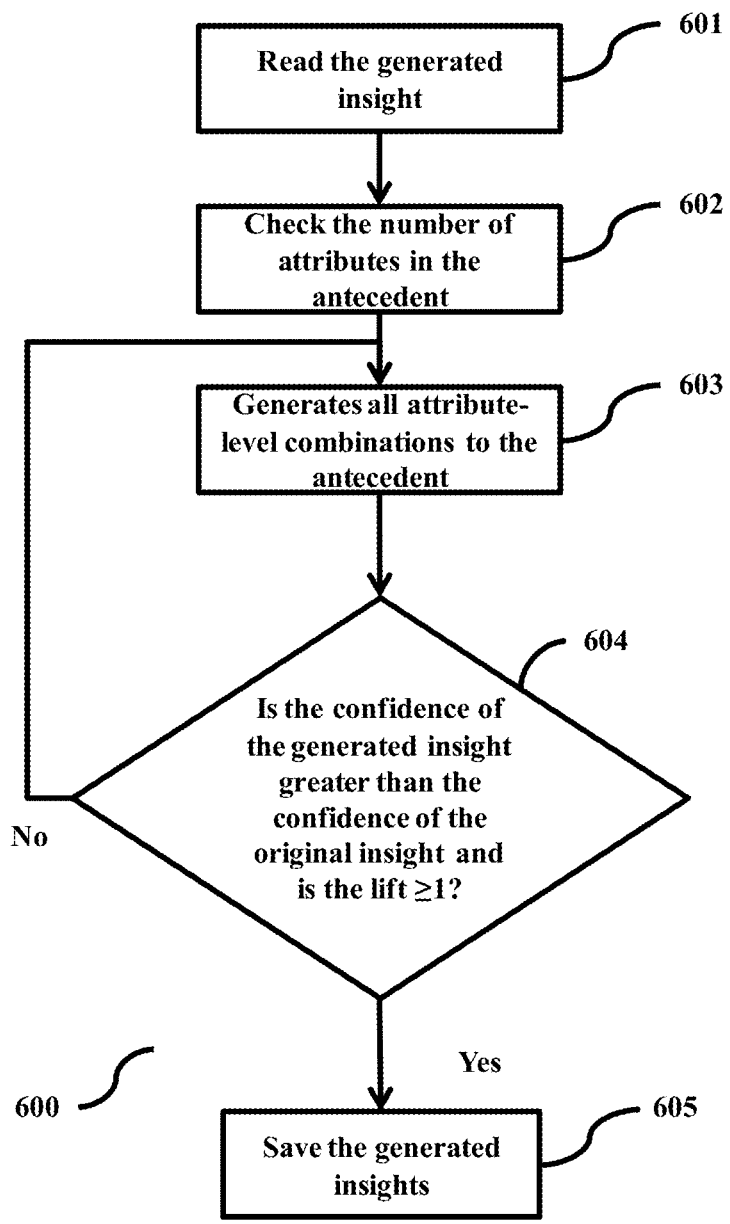
FIG. 6 depicts a flow chart for generating specialized insight from a given rule, according to embodiments as disclosed herein.

FIG. 6 depicts a flow chart for generating specialized insights from a given rule. The data-analyzing engine 101 reads (601) the generated insight and checks (602) the number of attributes in the antecedent or LHS. The data-analyzing engine 101 further generates (603) all attribute-level combinations to the antecedent by adding the attribute to the antecedent. The data-analyzing engine 101 further checks (604) if the confidence of the generated insight is greater than the confidence of the original insight and the Lift of the generated insight is greater than or equal to 1. If the confidence of the generated insight is greater than the confidence of the original insight and Lift of the generated Insight is greater than or equal to 1, the data-analyzing engine 101 saves (605) the generated insight, if the generated insight has not been saved previously. Else the generated insight is discarded. The various actions in method 600 may be performed in the order presented, in a different order or simultaneously. Further, in some embodiments, some actions listed in FIG. 6 may be omitted.

Figure 7:
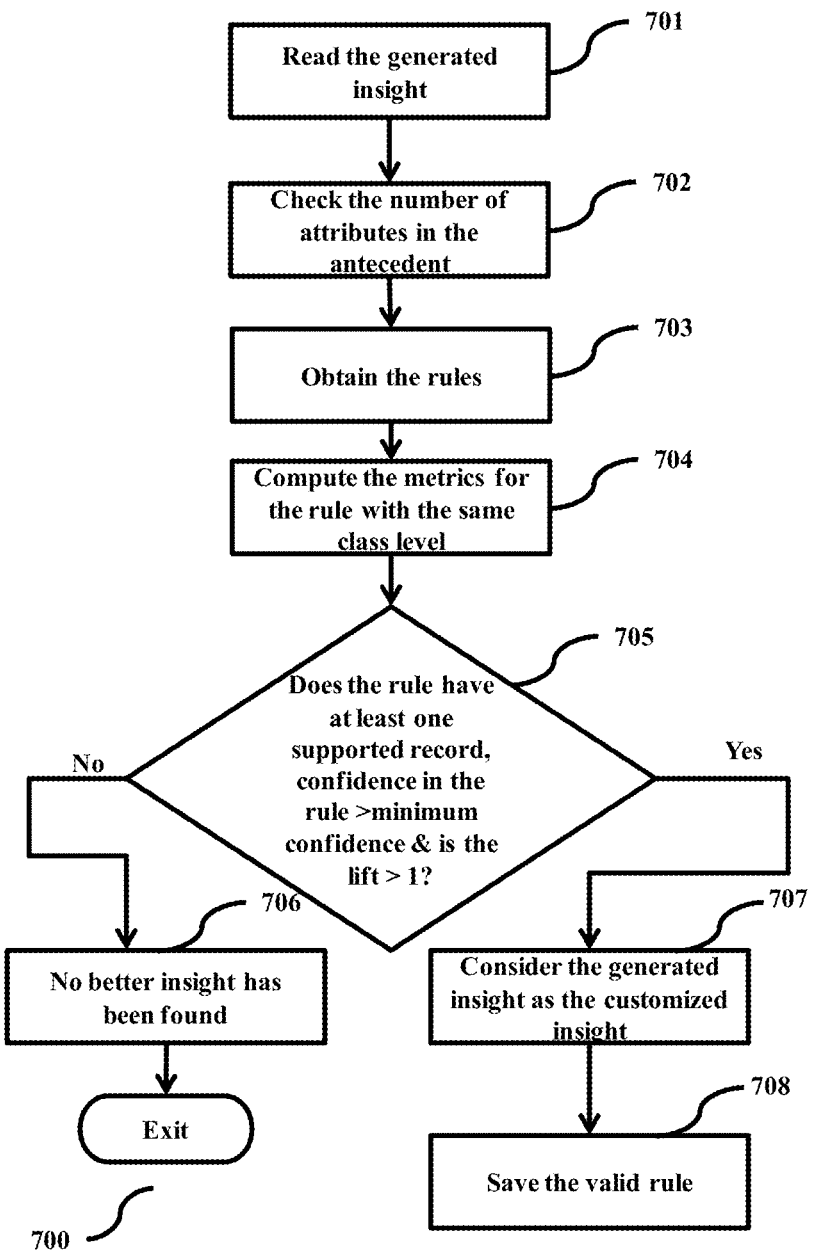
FIG. 7 depicts a flowchart for generating customized insight for a given rule according to embodiments as disclosed herein.

FIG. 7 depicts a flowchart for generating customized insight for a given rule. The data-analyzing engine 101 reads (701) the generated insight and checks (702) the number of attributes in the antecedent. The data-analyzing engine 101 obtains (703) the rule(s) by changing the level(s) of the attributes in the antecedent. The data-analyzing engine 101 computes (704) the metrics for the rule with the same class level. The data-analyzing engine 101 checks (705) if the rule has at least one supported record, confidence in the rule is greater than a minimum confidence and if the lift is greater than 1. If the rule does not have at least one supported record, confidence in the rule is greater than a minimum confidence and/or if the lift is greater than 1, the data-analyzing engine 101 determines (706) that no better insight has been found. If the rule has at least one supported record, if the lift is greater than 1, the data-analyzing engine 101 considers (707) the generated insight as the customized insight and displays the valid rule of the customized insight to at least one user. The display can comprise of the data-analyzing engine 101 communicating the rule to the user, using an inbuilt interface or on a remote device. In an embodiment herein, the data-analyzing engine 101 can enable the user to customize the rule. The data-analyzing engine 101 saves (708) the valid rule. In an embodiment herein, the user can opt to save or not save the rule. The various actions in method 700 may be performed in the order presented, in a different order or simultaneously. Further, in some embodiments, some actions listed in FIG. 7 may be omitted.

Figure 8:
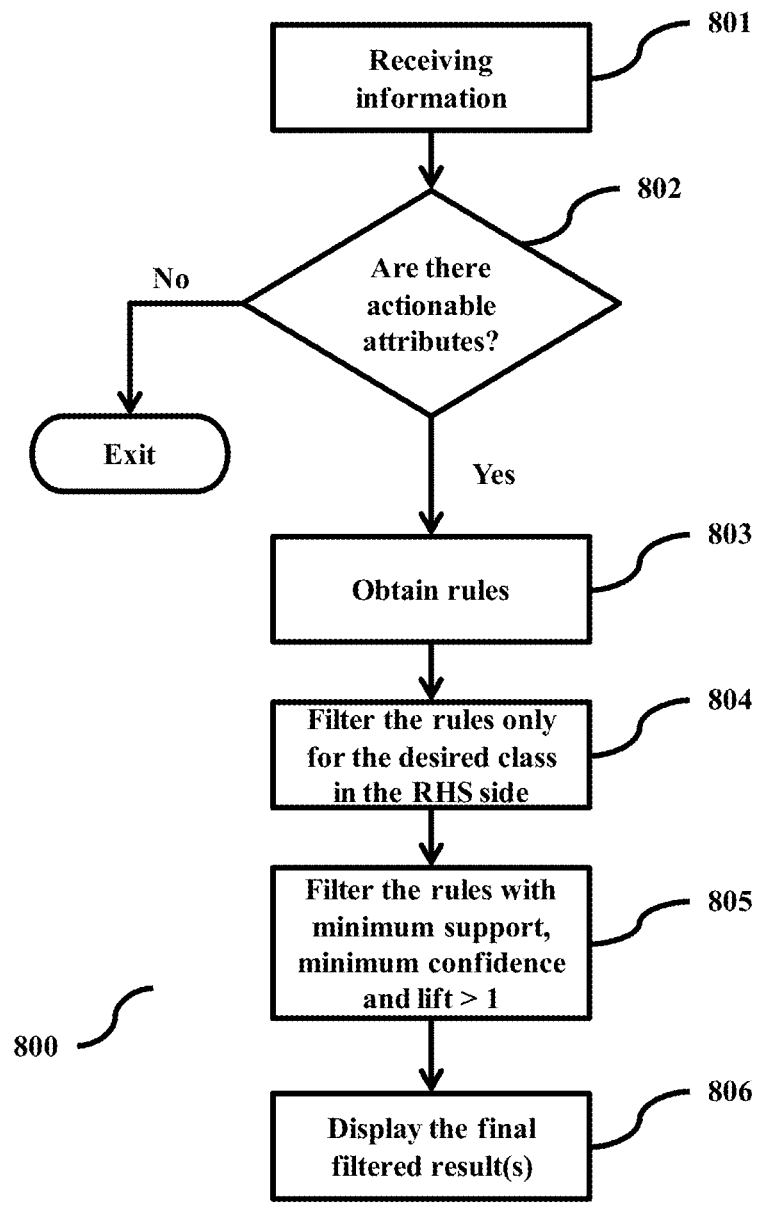
FIG. 8 depicts a flow chart for generating what-if insights for a selected class level for a given rule, according to embodiments as disclosed herein.

FIG. 8 depicts a flow chart for generating what-if insights for a selected class level for a given rule. On receiving (801) information (wherein the information comprises of the generated insight, desired class level, actionable attributes, and so on), the data-analyzing engine 101 checks (802) if there are actionable attributes. If there are actionable attributes, the data-analyzing engine 101 obtains (803) all possible rules by changing the levels in the actionable attributes. In an example, consider the following insight, if age is GE 23, city is Phoenix and Discount_type is 2, then CLTV is medium. Say the level of the Discount_type can be changed to other possible values (say it can take values such as 1, 2, 3, 4 or 5). If age is 23, city is Colorado and Discount_type is 1, then CLTV is high. Similarly, for four more insights with 2, 3, 4 and 5, values of discount are generated. Embodiments herein always use the most desired class of the target (here it is CLTV, and most desired class is High). Embodiments herein can request the user to provide information as to the most desired class of the target. Here, system not only shows a path for converting the Phoenix population of Age greater than or equal to 23 to make them exhibit a high CLTV, but at same time it presents the support for such recommendation is on the basis of similar population exhibiting high CLTV in a city "Colorado". The system also shows not one possible paths for better customer life time value but all possible i.e. there could be $2^{nd}$ path using different value for discount or the insight itself has multiple actionable attributes say discount and promotion Say there are four promotions possible. In total system can change 5 (discounts) multiplied by 4 promotions, 20 possible combinations. There are several possible actionable attribute combinations can be applied in that case. In all these possible ways, few combinations might result CLTV as high. In all those combinations where CLTV is high, there is a basis for the recommendation. System shows maximum top 10 paths to change the original selected insight RHS to CLTV=high. The top 10 are chosen on basis of the goodness of the rule along with the basis for the recommendation. This empowers users to pick the best recommendation(s) to be operationalized The data-analyzing engine 101 filters (804) the rules only for the desired class in the RHS side. What_if analysis is performed on insights that are showing less desired RHS. Objective of what-if is to find a path from a non-desired set of data to see if there is way they can be changed them to a desired set of data by matching them to closet population in terms of all characters. The data-analyzing engine 101 filters (805) the rules with minimum support, minimum confidence and lift greater than 1. The data-analyzing engine 101 displays (806) the final filtered result(s). In an embodiment herein, the data-analyzing engine 101 can sort the results based on factors such as score, and so on of the all possible insights that meet minimum support, confidence and lift as possible paths for the insight to be moved to most desired behavior.

In an embodiment herein, the data-analyzing engine 101 checks if the number of final filtered rules is greater than or equal to a first pre-defined number of rules (for example, 10, 15, and so on). If the number of final filtered rules is greater than or equal to the first pre-defined number of rules, the data-analyzing engine 101 displays the filtered rules. If the number of final filtered rules is not greater than or equal to the first pre-defined number of rules, the data-analyzing engine 101 checks if there is at least one final filtered rule is present. If there is at least one final filtered rule present, the data-analyzing engine 101 displays all the rules generated. The various actions in method 800 may be performed in the order presented, in a different order or simultaneously. Further, in some embodiments, some actions listed in FIG. 8 may be omitted.

Figure 9:
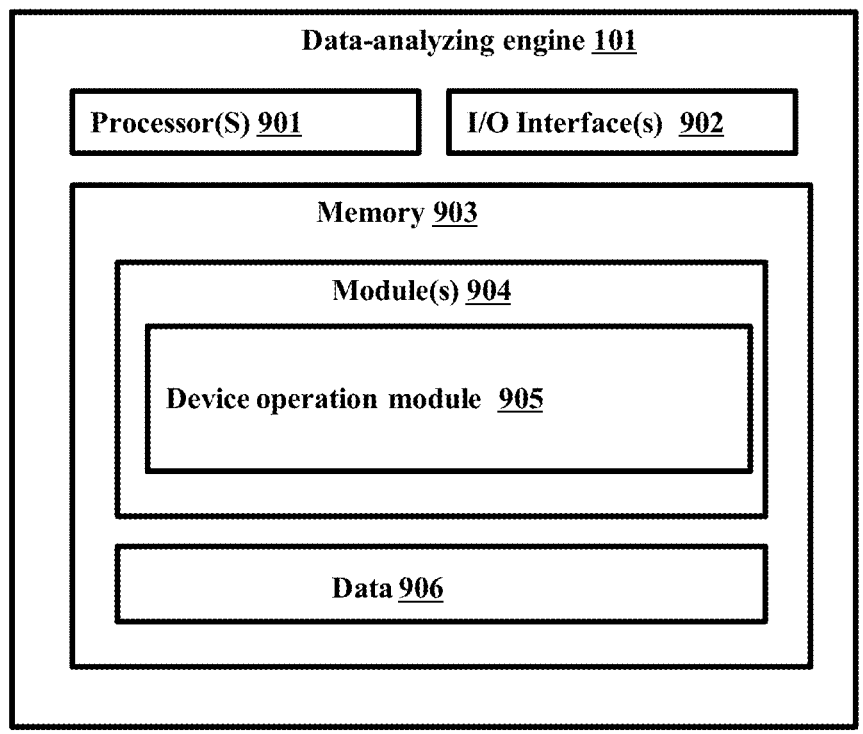
FIG. 9 illustrates a plurality of components of a device for extracting statistically significant patterns describing a specific behavior from a provided set of data, enabling modifications of the existing rules and providing recommendations that will enable decision making, according to embodiments as disclosed herein.

FIG. 9 illustrates a plurality of components of a device for extracting statistically significant patterns describing a specific behavior from a provided set of data, enabling modifications of the existing rules and providing recommendations that will enable decision making. Referring to FIG. 9, the data-analyzing engine 101 is illustrated in accordance with an embodiment of the present subject matter. In an embodiment, the engine 101 may include at least one processor 901, an input/output (I/O) interface 902 (herein a configurable user interface), and a memory 903. The at least one processor 901 may be implemented as one or more microprocessors, microcomputers, microcontrollers, digital signal processors, central processing units, state machines, logic circuitries, and/or any devices that manipulate signals based on operational instructions. Among other capabilities, the at least one processor 901 is configured to fetch and execute computer-readable instructions stored in the memory 903.

The I/O interface 902 may include a variety of software and hardware interfaces, for example, a web interface, a graphical user interface such as a display screen, a physical interface, or any other interface (either software or hardware), which will enable the user to interact with the data-analyzing engine 101.

The I/O interface 902 may allow the data-analyzing engine 101 to communicate with other devices. The I/O interface 902 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and any other communication means. The modules 904 include routines, programs, objects, components, and data structures, which perform particular tasks, functions or implement particular abstract data types. In one implementation, the modules 904 may include a device operation module 905. The device operation module 905 can be configured to execute one or more tasks corresponding to the application on the data-analyzing engine 101 in accordance with embodiments as disclosed herein.

The modules 904 may include programs or coded instructions that supplement applications and functions of the data-analyzing engine 101. The data 906, amongst other things, serves as a repository for storing data processed, received, and generated by one or more of the modules 904. Further, the names of the other components and modules of the data-analyzing engine 101 are illustrative and need not be construed as a limitation.

Embodiments herein enable users to understand the behavior of data from a plurality of business perspectives and take decisions that are supported by statistical significance, hereby elevating the knowledge of business users and guiding them in taking better decisions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for analyzing insights generated for a data, the method performed by a data-analyzing engine having a processor, the method comprising at least one of:

generating at least one generalized insight for at least one given rule from a set of generated insights;

generating at least one specialized insight for at least one given rule from the set of generated insights;

generating at least one customized insight for at least one given rule from the set of generated insights; and generating at least one what-if insight for a selected class level for at least one given rule from a set of generated insights, wherein the generating the at least one what-if insight comprises:

receiving, by the data analyzing engine, information comprising one or more of the generated insight, desired class level, and at least one actionable attribute from a user;

obtaining all possible rules by changing levels in the at least one actionable attribute on Left Hand Side (LHS) of a generated insight, wherein the generated insight is in terms of metrics comprising one or more of support, confidence, and lift of the generated insight; and displaying all possible paths for converting the LHS of the generated insight to exhibit the most desired class of RHS of the generated insight.

2. The method, as claimed in claim 1, wherein generating at least one generalized insight for at least one given rule from a set of generated insights further comprises:

checking if number of antecedents in at least one generated insight is greater than 1 by the data-analyzing engine;

dropping one attribute from the antecedent, if number of antecedents in at least one generated insight is greater than 1 by the data-analyzing engine;

recomputing at least one metric by the data-analyzing engine;

checking by the data-analyzing engine, if support of a generated insight is greater than the support of the original insight and lift is greater than or equal to 1; and saving the generated insight by the data-analyzing engine, if support of the at least one generated insight is greater than support of an original insight and lift is greater than or equal to 1.

3. The method, as claimed in claim 1, wherein generating at least one specialized insight for at least one given rule from the set of generated insights further comprises:

checking number of attributes in an antecedent in at least one generated insight by the data-analyzing engine;

generating all attribute-level combinations to the antecedent by adding the attribute to the antecedent by the data-analyzing engine;

checking if confidence of the at least one generated insight is greater than confidence of an original insight and lift is greater than or equal to 1 by the data-analyzing engine; and saving the at least one generated insight by the data-analyzing engine, if confidence of the at least one generated insight is greater than the confidence of the original insight and lift is greater than or equal to 1.

4. The method, as claimed in claim 1, wherein generating at least one customized insight for at least one given rule from the set of generated insights further comprises:

checking number of attributes in an antecedent in at least one generated insight by the data-analyzing engine;

obtaining at least one rule by changing at least one level of the attributes in the antecedent by the data-analyzing engine;

computing at least one metrics by the data-analyzing engine for the at least one given rule with a same class level;

checking if the at least one rule has at least one supported record, confidence in the at least one rule is greater than a minimum confidence and lift is greater than 1 by the data-analyzing engine; and considering the at least one valid rule as the customized insight by the data-analyzing engine, if the at least one rule has at least one supported record, confidence in the at least one rule is greater than the minimum confidence and the lift is greater than 1.

5. The method, as claimed in claim 1, wherein generating at least one what-if insight for a selected class level for at least one given rule from a set of generated insights further comprises:

filtering the obtained rules by the data-analyzing engine for desired class in Right Hand Side (RHS);

filtering the filtered rules by the data-analyzing engine for at least one rule with minimum support, minimum confidence and lift greater than 1; and displaying the filtered rules by the data-analyzing engine.

6. The method, as claimed in claim 5, wherein the method comprises of sorting the filtered rules based on at least one factor by the data-analyzing engine.

7. A system for analyzing insights generated for a data, the system comprising:

a processor;

a memory coupled to the processor, wherein the processor is to:

generate at least one generalized insight for at least one given rule from a set of generated insights;

generate at least one specialized insight for at least one given rule from the set of generated insights;

generate at least one customized insight for at least one given rule from the set of generated insights; and generate at least one what-if insight for a selected class level for at least one given rule from a set of generated insights, wherein, for generating the at least one what-if insight for a selected class level, the processor is to:

receive information comprising one or more of the generated insight, desired class level, and actionable attributes from a user;

obtain all possible rules by changing levels in the actionable attributes on Left Hand Side (LHS) of a generated insight, wherein the generated insight is in terms of metrics comprising one or more of support, confidence, and lift of the generated insight; and display all possible paths for converting the LHS of the generated insight to exhibit the most desired class of RHS of the generated insight.

8. The system, as claimed in claim 7, wherein, for generating at least one generalized insight for at least one given rule from a set of generated insights, the processor is to:

check if number of antecedents in at least one generated insight is greater than 1;

drop one attribute from the antecedent, if number of antecedents in at least one generated insight is greater than 1;

recompute at least one metric;

check if support of a generated insight is greater than the support of the original insight and lift is greater than or equal to 1; and save the generated insight, if support of the at least one generated insight is greater than support of an original insight and lift is greater than or equal to 1.

9. The system, as claimed in claim 7, wherein, for generating at least one specialized insight for at least one given rule from the set of generated insights, the processor is to:

check number of attributes in an antecedent in at least one generated insight;

generate all attribute-level combinations to the antecedent by adding the attribute to the antecedent;

check if confidence of the at least one generated insight is greater than confidence of an original insight and lift is greater than or equal to 1; and save the at least one generated insight, if confidence of the at least one generated insight is greater than the confidence of the original insight and lift is greater than or equal to 1.

10. The system, as claimed in claim 7, wherein, for generating at least one customized insight for at least one given rule from the set of generated insights, the processor is to:

check number of attributes in an antecedent in at least one generated insight;

obtain at least one rule by changing at least one level of the attributes in the antecedent;

compute at least one metrics for the at least one given rule with a same class level;

check if the at least one rule has at least one supported record, confidence in the at least one rule is greater than a minimum confidence and lift is greater than 1; and consider the at least one valid rule as the customized insight, if the at least one rule has at least one supported record, confidence in the at least one rule is greater than the minimum confidence and the lift is greater than 1.

11. The system, as claimed in claim 7, wherein, for generating at least one what-if insight for a selected class level for at least one given rule from a set of generated insights, the processor is to:
- filter the obtained rules for desired class in Right Hand Side (RHS);
- filter the filtered rules for at least one rule with minimum support, minimum confidence and lift greater than 1; and
- display the filtered rules.

12. The system, as claimed in claim 11, wherein the processor is to sort the filtered rules based on at least one factor.

* * * * *